Oct. 26, 1954        W. P. FLECK ET AL        2,692,686
SELF-ADJUSTING EDGE-FILTER
Filed March 21, 1951        2 Sheets—Sheet 1

INVENTORS
WILLIAM P. FLECK
BY HENRY J. AMON

Attorney

Oct. 26, 1954  W. P. FLECK ET AL  2,692,686
SELF-ADJUSTING EDGE-FILTER

Filed March 21, 1951  2 Sheets-Sheet 2

INVENTORS
WILLIAM P. FLECK
BY HENRY J. AMON

Attorney

Patented Oct. 26, 1954

2,692,686

UNITED STATES PATENT OFFICE 2,692,686

SELF-ADJUSTING EDGE-FILTER

William P. Fleck and Henry J. Amon, Baltimore, Md.

Application March 21, 1951, Serial No. 216,682

6 Claims. (Cl. 210—179)

This invention relates to filters for fluids, either gaseous or liquid, and particularly to a filter wherein the principal removal of foreign substances is by "edge filtration," that is, by straining between adjacent surfaces of the filter element, and wherein a positive external force is required to maintain the filter element surfaces in proper proximity.

In the preferred embodiment of this invention, the inlet fluid pressure is utilized to supply this positive external force. As foreign substances are strained by the filter, however, there is a tendency for this inlet pressure to increase. This increase in pressure would tend to force the surfaces of the filter element into closer contact, further increasing pressure to rapidly render the filter ineffective.

It has been discovered that, in practice, this tendency can be very satisfactorily and sensitively compensated for by a bellows control unit whose tendency to collapse with increasing pressure is utilized to separate the filter element surfaces slightly whenever inlet pressure increases. In this manner, it has been found, effective filtering action can be prolonged very considerably as compared with other edge filtration devices.

It is therefore an important object of the invention to provide a uniquely sensitive control unit for automatically compensating for decreasing flow in an "edge" type filter.

It is a further object of the invention to provide an especially effective filter element design for operation in conjunction with the control unit.

It is a still further object of the invention to provide a novel filter harness incorporating the control unit which is quickly and simply assembled and is adaptable to standard filter cases.

Other advantages and objects of the invention will be apparent from the following description and accompanying drawings, in which.

Similar numerals refer to similar parts throughout the several views.

Figure 1:
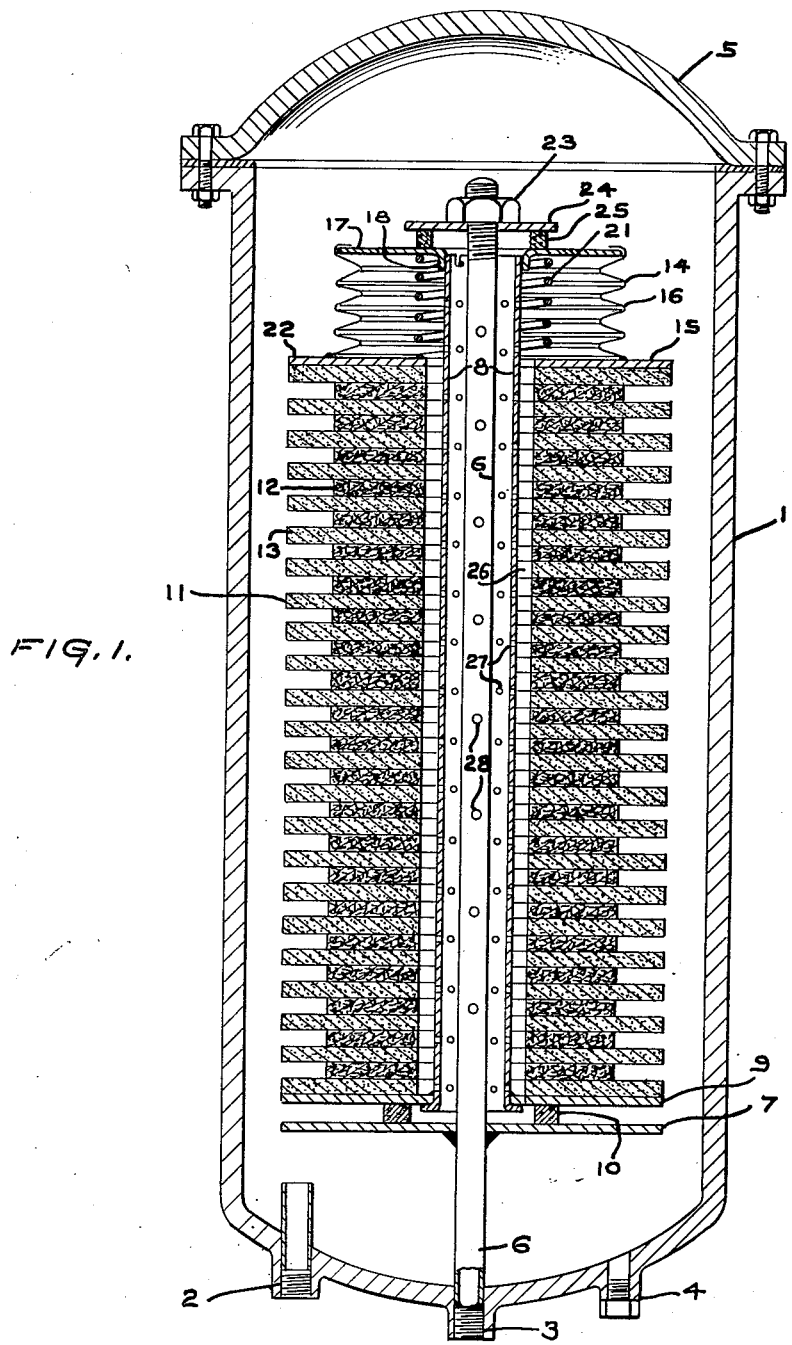
Figure 1 is a vertical scetional view of the filter of the invention.
Figure 3:
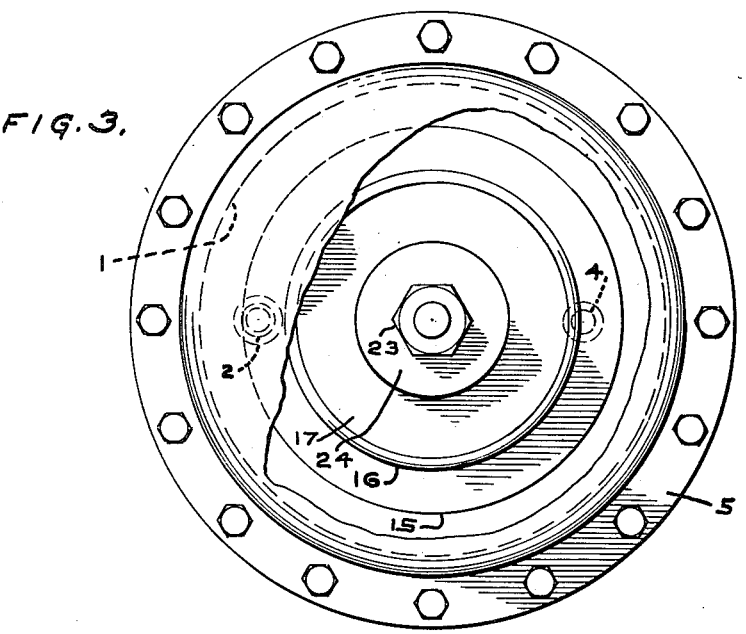
Figure 3 is a top plan view of the filter, partly broken away.
Figure 2:
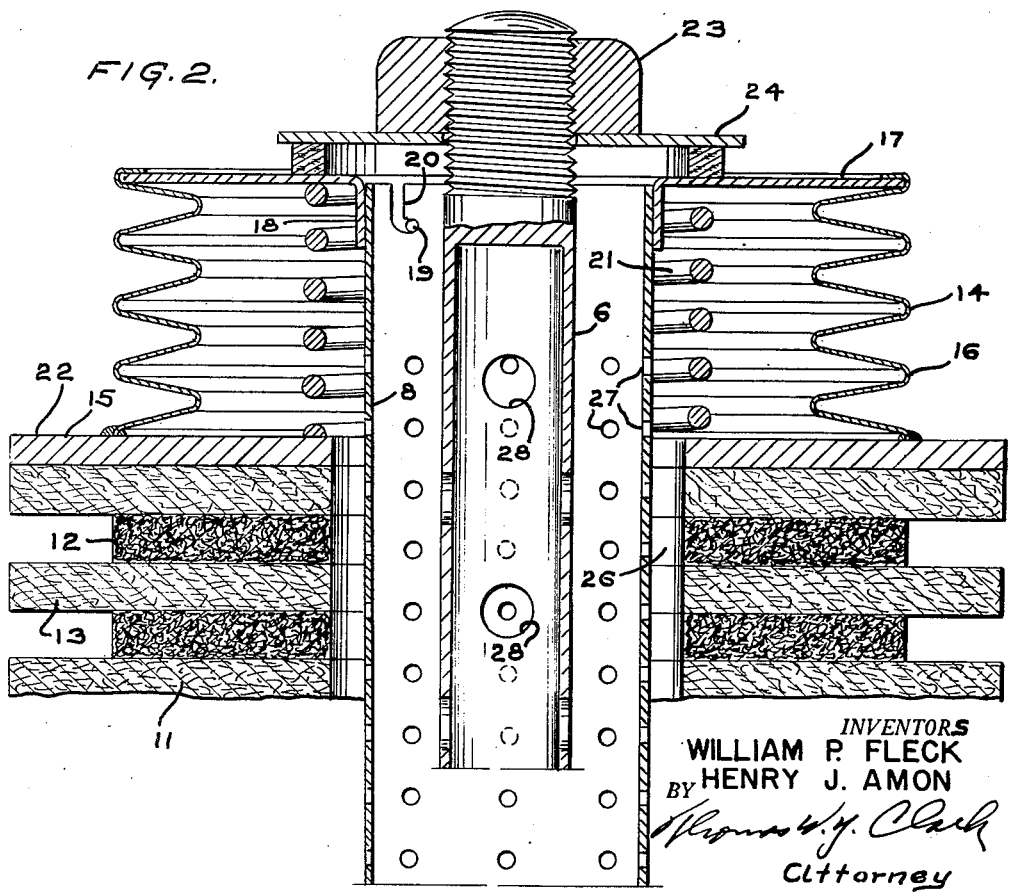
Figure 2 is an enlarged partial vertical sectional view of the control unit of the filter.

The filter case comprises a cylindrical body 1 having an inlet 2, outlet 3 and drain 4, and a cover 5 for the body.

A tube 6 is threadedly mounted in the outlet 3 and has a plate 7 welded thereto at its lower end. A center tube 8 fits loosely over the outlet tube 6 and has a filter supporting annulus 9 separated from plate 7 by cork gasket 10. A filter element 11 comprising annular disks 12 and 13 fits loosely over the center tube and is supported on flange 9, rigidly affixed to tube 8.

To regulate the separation of the disks, a control unit 14 is provided comprising a pressure plate 15 loosely fitting over the center tube 8 and resting on the filter element 11, a bellows 16 preferably of substantially the same diameter as disks 12 connected by a sealed joint at one end to said pressure plate 15 intermediate the edges thereof, and a lock plate 17 snugly telescoping on said center tube 8 and attached by a sealed joint to the other end of said bellows 16. The lock plate 17 has a downturned flange 18 having pins 19 cooperating with bayonet slots 20 of the center tube 8 to hold the lock plate on the center tube. A compression spring 21 may be provided within the bellows to hold the filter element compact, before fluid is admitted to the case. The bellows itself could be constructed of such resilient material as to serve also as a spring, eliminating the need of the separate spring, if desired. When fluid is admitted through inlet 2, filter element compacting pressure is exerted on the outer annular area 22 of pressure plate 15 which counteracts the tendency of the fluid to wedge between the disks 12 and 13. Nut 23, washer 24, and cork gasket 25 seal off the top of the center tube 8, which it itself closed at its top. Fluid flows primarily between the adjacent edges of the disks 12 and 13 into the central annular space 26 and through apertures 27 and 28 of the center and outlet tubes 8 and 6. Openings 27 can be so regulated in size as to form a regulator for the total oil passing through the filter, and so to prevent the filter element from acting too fast.

Disks 12 are of dense non-filtering material and of smaller diameter than filtering disks 13 and are stacked alternately therewith. This arrangement has been found peculiarly effective in conjunction with a control unit such as 14. Tests indicate that the foreign matter arranges itself between the large diameter filtering disks in a solid compact mass. This build up continues until the mass projects slightly beyond the larger diameter filtering disks. At this point efficient filtering is at an end though flow is not impeded because of the compensating action of the control unit. The filter element can then be cleaned or a new element can be substituted.

The operation of the bellows control unit is as follows:

As the mass of foreign substance accumulates, there is a tendency for filtering flow to slow down and inlet pressure to build up. This increase of pressure acts to collapse the bellows 16 slightly by vertical pressure on the outer rings thereof to lift the pressure plate 15 away from flange 9 allowing the separating of the disks of the filter element somewhat and increasing flow again to the proper level. This bellows action is so sensitive that proper filtering is maintained for the life of the filter element. The inside of the bellows is open to the filter outlet pressure through the tube 6, just as the outside of the bellows is exposed to the inlet pressure surrounding the element. It will be noted that a dynamic equilibrium is maintained between pressure tending to separate the disks, pressure exerted on the pressure plate to hold the disks together and pressure on the bellows tending to separate the disks. It is the discovery that this triple force equilibrium can be maintained to continue full flow and proper filtering as foreign matter accumulates in the filter element which is the foundation for the present invention. The bellows regulator enables the filter to "breathe," i. e. expand and contract as the disk spaces fill and separate. It is also noted that a measure of filtration goes through the softer disks 13, they remain filled with fluid, but clean at their surfaces contacting disks 12.

The bellows also acts as a seal between plate 15 and tube 8.

What is claimed as new and is desired to be secured by Letters Patent is:

1. A fluid filter including a body having spaced inlet and outlet openings, a filter element interposed between the openings comprising a stack of annular disks, alternate disks being of smaller outer diameter than the other disks, a center tube connected to the outlet opening and having orifices in the sides thereof, an annular flange at one end of said tube supporting said disks axially of the tube, an annular pressure plate fitting over the other end of said tube to hold the disks on the tube and against the flange, a lock plate engaging said other end of said tube, a collapsible and expansible bellows exposed to inlet pressure and connected by sealed joints to said lock plate at one end and to a portion of said annular pressure plate intermediate the inner and outer edges at the other end, leaving a portion of the surface of said pressure plate exposed to inlet fluid pressure, the pressure plate thereby tending to compress the disks against the flange when exposed to inlet pressure, said bellows collapsing to lift said plate away from said flange on increased filtering resistance of said filter element and a spring around said center tube engaging said lock plate and pressure plate to separate them to expand the bellows.

2. A fluid filter including a body having spaced inlet and outlet openings, a filter element interposed between the openings comprising a stack of annular disks, alternate disks being of smaller outer diameter than the other disks, a center tube connected to the outlet opening and having orifices in the sides thereof, an annular flange at one end of said tube supporting said disks axially of the tube, an annular pressure plate fitting over the other end of said tube to hold the disks on the tube and against the flange, a lock plate engaging said other end of said tube, a generally cylindrical collapsible and expansible bellows exposed to inlet pressure and connected by sealed joints to said lock plate at one end and to a portion of said annular pressure plate intermediate the inner and outer edges at the other end, leaving a portion of the surface of said pressure plate exposed to inlet fluid pressure, the pressure plate thereby tending to compress the disks against the flange when exposed to inlet pressure, said bellows collapsing to lift said plate away from said flange on increased filtering resistance of said filter element, the outer diameter of the bellows being substantially the same as the diameter of the smaller filter disks.

3. A fluid filter including a body having spaced inlet and outlet openings, a filter element interposed between the openings comprising a stack of annular disks, a substantial proportion of the disks being soft, edge filtering disks, spaced substantially throughout the length of the stack, a center tube connected to the outlet opening, the center tube outlet constituting the sole connection of the element to the body and being closed at the other end, an annular flange at one end of said tube supporting said disks axially of the tube, an annular pressure plate fitting over the other end of said tube to hold the disks on the tube and against the flange, a lock plate engaging said closed end of said tube, said tube having orifices in the sides thereof between the lock plate and annular flange, a cylindrical collapsible and expansible impervious bellows outwardly exposed to inlet pressure and inwardly exposed to outlet pressure through the center tube wholly supported on said element and connectedly sealed to said lock plate at one end and to said annular pressure plate at the other end, blocking flow to the center tube between the tube closed end and pressure plate, said bellows being resilient and tending to compress the soft disks together and the stack of disks against the flange, said bellows collapsing under the compression of the inlet pressure to lift said pressure plate away from said flange on increased filtering resistance of said filter element to release the compression on the soft disks throughout the length of the stack.

4. A fluid filter comprising a center tube closed at one end and open at the other adapted to be placed in a filter casing having a fluid inlet and outlet and connected to the casing solely by the open end of said tube, the tube having a filter element holding member at the open end, a pressure plate fitting over the tube adjacent the closed end, a longitudinally compressible and expansible filtering element around said tube, between the holding member and pressure plate and comprising a substantial proportion of soft, edge filtering disks spaced throughout the length of the element, a lock plate fixedly attached to said tube at said closed end, said tube having openings therein between the lock plate and holding member for the passage of fluid through the filter element, the tube openings and the interior of said tube, and a resilient cylindrical expansible and collapsible impervious bellows connected by sealed joints to and between said lock plate and said pressure plate, blocking flow to the center tube between the closed tube end and the pressure plate, the bellows being wholly supported on said element to vary the pressure on the pressure plate, the bellows and filter element being subject to inlet fluid pressure when placed in a casing, the fluid pressure outside the bellows collapsing the bellows and lifting said pressure plate away from said holding member to relieve pressure on the filtering element throughout its length.

5. A fluid filter comprising a center tube closed at one end and open at the other adapted to be placed in a filter casing having a fluid inlet and outlet and connected to the casing solely by the open end of said tube, the tube having a filter element holding member at the open end, a pressure plate fitting over the tube adjacent the closed end, a longitudinally compressible and expansible filtering element around said tube, between the holding member and pressure plate and comprising a substantial proportion of soft, edge filtering disks spaced throughout the length of the element, a lock plate fixedly attached to said tube at said closed end, said tube having openings therein between the lock place and holding member for the passage of fluid through the filter element, the tube openings and the interior of said tube and a cylindrical expansible and collapsible impervious bellows connected by sealed joints to and between said lock place and said pressure plate, blocking flow to the center tube between the closed tube end and the pressure plate, the bellows being wholly supported on said element to vary the pressure on the pressure plate, the bellows and filter element being subject to inlet fluid pressure when placed in a casing, the fluid pressure outside the bellows collapsing the bellows and lifting said pressure plate away from said holding member to relieve pressure on the filtering element throughout its length, and a spring, telescoping over the center tube and engaging said lock plate and pressure plate to urge them to expand the bellows.

6. A fluid filter comprising a center tube closed at one end and open at the other adapted to be placed in a filter casing having a fluid inlet and outlet and connected to the casing solely by the open end of said tube, the tube having a filter element holding member at the open end, a pressure plate fitting over the tube adjacent the closed end, a longitudinally compressible and expansible filtering element around said tube, between the holding member and pressure plate comprising a substantial proportion of soft, edge filtering disks spaced throughout the length of the tube and other disks of different area spacing said soft disks, thereby forming notches lengthwise of the element outer surface between the disks, a lock plate fixedly attached to said tube at said closed end, said tube having openings therein between the lock plate and holding member for the passage of fluid through the filter element, the tube openings and the interior of said tube and a resilient cylindrical expansible and collapsible impervious bellows connected by sealed joints to and between said lock plate and said pressure plate, blocking flow to the center tube between the closed tube end and the pressure plate, the bellows being wholly supported on said element to vary the pressure on the pressure plate, the bellows and filter element being subject to inlet fluid pressure when placed in a casing, the fluid pressure outside the bellows collapsing the bellows and lifting said pressure plate away from said holding member to relieve pressure on the filtering element throughout its length.

References Cited in the file of this patent

UNITED STATES PATENTS

| Number | Name | Date |
|---|---|---|
| 515,769 | Harris | Mar. 6, 1894 |
| 730,485 | Simoneton | June 9, 1903 |
| 1,453,310 | Engel | May 1, 1923 |
| 2,079,365 | Thomas | May 4, 1937 |
| 2,134,061 | Thomas | Oct. 25, 1938 |
| 2,455,486 | Hicks | Dec. 7, 1948 |
| 2,480,518 | Strassheim | Aug. 30, 1949 |
| 2,495,095 | Ewbank | Jan. 17, 1950 |
| 2,562,361 | Kasten | July 31, 1951 |

FOREIGN PATENTS

| Number | Country | Date |
|---|---|---|
| 589,458 | Great Britain | June 20, 1947 |